United States Patent
Cai et al.

(10) Patent No.: US 9,410,001 B2
(45) Date of Patent: Aug. 9, 2016

(54) RECYCLE GAS COOLER SYSTEMS FOR GAS-PHASE POLYMERIZATION PROCESSES

(71) Applicant: Univation Technologies, LLC, Houston, TX (US)

(72) Inventors: Ping Cai, Lake Jackson, TX (US); James L. Swecker, II, Clendenin, WV (US); Mark W. Blood, Hurricane, WV (US); Laura J. Dietsche, II, Midland, MI (US); F. David Hussein, Hilton Head Island, SC (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/434,127

(22) PCT Filed: Nov. 11, 2013

(86) PCT No.: PCT/US2013/069420
§ 371 (c)(1),
(2) Date: Apr. 8, 2015

(87) PCT Pub. No.: WO2014/074981
PCT Pub. Date: May 15, 2014

(65) Prior Publication Data
US 2015/0284481 A1 Oct. 8, 2015

Related U.S. Application Data

(60) Provisional application No. 61/725,119, filed on Nov. 12, 2012.

(51) Int. Cl.
| | |
|---|---|
| *C08F 2/01* | (2006.01) |
| *C08F 2/34* | (2006.01) |
| *F28D 7/16* | (2006.01) |
| *F28F 19/00* | (2006.01) |
| *F28F 9/02* | (2006.01) |
| *F28F 9/26* | (2006.01) |
| *B01J 8/24* | (2006.01) |

(52) U.S. Cl.
CPC ... *C08F 2/01* (2013.01); *C08F 2/34* (2013.01); *F28D 7/16* (2013.01); *F28F 9/0256* (2013.01); *F28F 9/26* (2013.01); *F28F 19/00* (2013.01)

(58) Field of Classification Search
CPC ............... C08F 2/01; C08F 2/34; F28D 7/16; F28F 9/0256; F28F 9/26
USPC .................................................. 526/67, 920
See application file for complete search history.

(56) References Cited

U.S. PATENT DOCUMENTS

| 6,845,813 B1 | 1/2005 | Knight et al. |
| 2002/0048537 A1 | 4/2002 | Maurel |

FOREIGN PATENT DOCUMENTS

| EP | 2431498 | 3/2012 |
| WO | WO 2008/113496 | 9/2008 |
| WO | WO 2009/131663 | 10/2009 |

OTHER PUBLICATIONS

Mostafa M. Awad (2011). Fouling of Heat Transfer Surfaces, Heat Transfer—Theoretical Analysis, Experimental Investigations and Industrial Systems, Prof. Aziz Belmiloudi (Ed.), ISBN: 978-953-307-226-5, InTech, http://www.intechopen.com/books/heat-transfer-theoretical-analysis-experimentalinvestigations-and-industrial-systems/fouling-of-heat-transfer-surfaces (40 pgs).
Neigel, "Measuring Flow in Tight Spots" Jul. 9, 1998 (2 pgs).

*Primary Examiner* — Fred M Teskin
(74) *Attorney, Agent, or Firm* — Brooks, Cameron & Huebsch, PLLC

(57) ABSTRACT

Disclosed herein are improvements in recycle gas cooler systems in gas-phase polymerization processes that reduce the tendency for cooler fouling, including a recycle gas cooler system comprising a shell-and-tube heat exchanger. One or more of the tubes of the shell-and-tube heat exchanger may have a flared tube inlet at the tube sheet. The shell-and-tube heat exchanger may also be coupled to a straight inlet pipe having a length that is either at least about 5 times the inner diameter of the straight inlet pipe or at least about 15 feet, whichever is greater.

18 Claims, 3 Drawing Sheets

RECYCLE GAS COOLER SYSTEMS FOR GAS-PHASE POLYMERIZATION PROCESSES

CROSS-REFERENCE TO RELATED APPLICATIONS

This application is a National Stage application under 35 U.S.C. §371 of International Application No. PCT/US2013/069420, filed Nov. 11, 2013, that claims the benefit of Ser. No. 61/725,119, filed Nov. 12, 2012, the disclosures of which are incorporated by reference in their entireties.

BACKGROUND

The invention generally relates to improvements in recycle gas cooler systems for gas-phase polymerization processes that reduce the tendency for cooler fouling.

Advances in polymerization and catalysts have produced new polymers having improved physical and mechanical properties useful in a wide variety of products and applications. With the development of new catalysts, the choice of polymerization process, such as solution, slurry, high pressure or gas phase, for producing a particular polymer has been greatly expanded. Advances in polymerization technology have also provided more efficient, highly productive and economically enhanced processes.

One technique for polymer production involves a gas-phase polymerization process. In gas-phase polymerization processes, recycle gas is typically withdrawn from the polymerization reactor and passed through a cooler for removal of reaction heat and optionally also for partial condensing. After cooling, the recycle gas is typically returned to the polymerization reactor. The cooler is typically a shell-and-tube heat exchanger, for example, with cooling water on the shell side and the recycle gas on the tube side. Because the recycle gas may contain catalyst particles and polymer particles, there is a possibility of continued polymerization in the cooler, which can lead to polymer formation in the cooler, particularly at sections where there may be relatively slow particle velocities. The polymer formed in the cooler may accumulate on the cooler walls and lead to fouling. As a result of this fouling, pressure drop across the cooler may increase. In addition, the fouling may cause a reduction in the heat-transfer efficiency of the cooler and, thus, a reduction in production rate for the polymerization process. If problems associated with fouling are severe enough, the polymerization reactor may need to be shut down for cooler cleaning. However, there are considerable costs associated with reactor shut down, including the loss of production time, for example.

Accordingly, there exists a need for improved gas-phase polymerization processes that can reduce cooler fouling so as to maximize operation time of the cooler with resultant increased operating time for the polymerization reactor.

SUMMARY

Disclosed herein are recycle gas cooler systems for gas-phase polymerization processes. For example, the recycle gas cooler systems may comprise an upstream elbow having a centerline radius, a straight inlet pipe coupled to the upstream elbow and having an inner diameter and a length, and a shell-and-tube heat exchanger. The shell-and-tube heat exchanger may comprise a shell having a first end and a second end, wherein the shell comprises a cooling fluid inlet and a cooling fluid outlet. The shell-and-tube heat exchanger may further comprise tubes disposed in the shell, wherein the tubes are fixed in a tube sheet at the first end of the shell. The shell-and-tube heat exchanger may further comprise an inlet header coupled to the first end of the shell, the inlet header comprising a fluid inlet coupled to the straight inlet pipe. The shell-and-tube heat exchanger may further comprise an outlet header coupled to the second end of the shell, the outlet header comprising a fluid outlet. The length of the straight inlet pipe may be either at least about 5 times the inner diameter of the straight inlet pipe or at least about 15 feet, whichever is greater.

Disclosed herein are recycle gas coolers for gas-phase polymerization processes. For example, the recycle gas coolers may comprise a shell-and-tube heat exchanger. The shell-and-tube heat exchanger may comprise a shell having a first end and a second end, wherein the shell comprises a cooling fluid inlet and a cooling fluid outlet. The shell-and-tube heat exchanger may further comprise tubes disposed in the shell, wherein the tubes are fixed in a tube sheet at the first end of the shell, wherein one or more tubes has a flared tube inlet at the tube sheet. The shell-and-tube heat exchanger may further comprise an inlet header coupled to the first end of the shell. The shell-and-tube heat exchanger may further comprise an outlet header coupled to the second end of the shell, the outlet header comprising a fluid outlet.

BRIEF DESCRIPTION OF THE DRAWINGS

These drawings illustrate certain aspects of the present invention and do not limit or define the invention.

DETAILED DESCRIPTION

The invention generally relates to improvements in recycle gas cooler systems in gas-phase polymerization processes that may reduce the tendency for cooler fouling.

In gas-phase polymerization processes, reactor down time can be minimized and efficiency of the process can be improved if cooler fouling is reduced. It has been found that the front end of the recycle gas cooler, and specifically the first fifteen to twenty feet, particularly the first three to five feet, of the cooler tubes, as well as the tube sheet itself, are the locations that may be most prone to fouling. Without wishing to be bound by theory, it is believed that a number of factors contribute to this fouling. For example, local vortex flow and slow down of the solids carried by the recycle gas increase the residence time of the catalyst particles at these locations, which increases the potential for fouling.

Embodiments disclosed herein relate to improvements in the design of the cooler inlet, associated piping, and geometry of the cooling tubes to reduce the tendency for cooler fouling. More particularly, embodiments disclosed herein relate to increasing the length of straight pipe between the upstream elbow and the cooler inlet. Additional embodiments disclosed herein relate to the use of cooler tubes having flared inlets. Embodiments are additionally directed to increasing the recycle gas coolers designed gas momentum flux to 3000 lb/ft/sec² or more, increasing the length of the inlet header of the recycle gas cooler, and/or use of a long radius elbow for the upstream elbow to the recycle gas cooler. In several of the embodiments disclosed herein it has been found that the design improvements for the recycle gas cooler can result in gas flow through the front end of the cooler and tube inlets that is more uniform with respect to direction and velocity. More uniform gas flow may be advantageous for a number of reasons, including reducing vortex flow and the resulting slow down of solids carried by the recycle gas, which decreases the residence time of catalyst particles in the recycle gas cooler. This results in decreased polymer formation in the cooler, and thus less potential for fouling.

Figure 1:
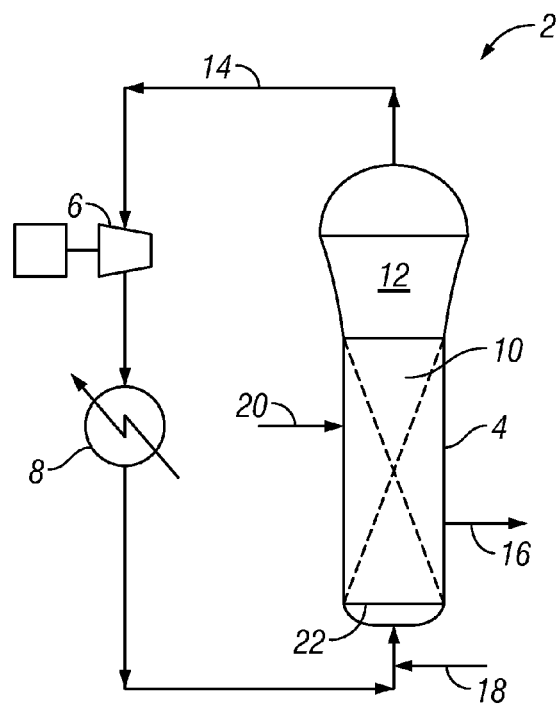
FIG. 1 is a schematic diagram illustrating an example of a polymerization system with a recycle gas cooler.

Referring now to FIG. 1, a polymerization system 2 is illustrated in accordance with example embodiments. In the illustrated embodiment, the polymerization system 2 includes a polymerization reactor 4, a recycle gas compressor 6 coupled to the polymerization reactor, and a recycle gas cooler 8 coupled to the polymerization reactor 4 downstream of the recycle gas compressor.

As illustrated, the polymerization reactor 4 may include a reaction zone 10 and a velocity-reduction zone 12. The reaction zone 10 may include a fluidized bed comprising growing polymer particles, formed polymer particles, and small amounts of catalyst, fluidized by the continuous flow from the recycle stream, which may be fed to the polymerization reactor 4 via recycle line 14. Polymer product may be removed from the reaction zone 10 via product discharge line 16. As illustrated, feed to the polymerization reactor 4 via recycle line 14 may contain both make-up fluid (e.g., fresh monomer and/or comonomer) from make-up line 18 and recycled fluid from the polymerization reactor 4. The catalyst may be fed into the reaction zone 10 of polymerization reactor 4 by way of catalyst injection line 20. Any of a variety of different catalysts may be used, including liquid-form catalysts, solid catalysts, and supported solid catalysts, among others, and may be fed to the polymerization reactor 4 as a slurry (liquid/solid mixture) or as a solid, for example. Examples of suitable catalysts for use in embodiments of the present invention will be described in more detail below.

The recycle stream may enter the polymerization reactor 4 via recycle line 14 through a distributor plate 22 at the bottom of the reaction zone 10. The distributor plate 22 may aid in uniform distribution of the recycle stream and also support the solid particles of the fluidized bed contained in the reaction zone 10. Fluidization of the fluidized bed in the reaction zone 10 results, for example, from the high rate at which the recycle stream flows into and through the polymerization reactor 4. The high rate of the recycle stream allows for the superficial gas velocity to suspend and mix the fluidized bed in the reaction zone 10 in a fluidized state. The recycle stream passes upward through the reaction zone 10, absorbing heat generated by the polymerization process. A portion of the recycle stream leaves the reaction zone 10 and passes through the velocity-reduction zone 12. Some polymer particles may be entrained within this portion of the recycle stream. In the velocity-reduction zone 12, most polymer particles entrained within the recycle stream should drop back down into the reaction zone 10, thereby reducing the amount of polymer particles that may exit the polymerization reactor 4 in the recycle stream that exits the polymerization reactor via the recycle line 14.

The recycle gas compressor 6 may be used to compress the recycle stream in recycle line 14. While not illustrated, a gas analyzer may be used to analyze samples from the recycle line 14 prior to its return to the polymerization reactor 4. After compression, the recycle stream may flow through the recycle gas cooler 8 via recycle line 14, to remove heat and cool the recycle stream. Any of a variety of different cooling fluids may be used in the recycle gas cooler 8 for cooling the recycle stream. For example, the cooling fluid used in the recycle gas cooler 8 may include water.

Figure 2:
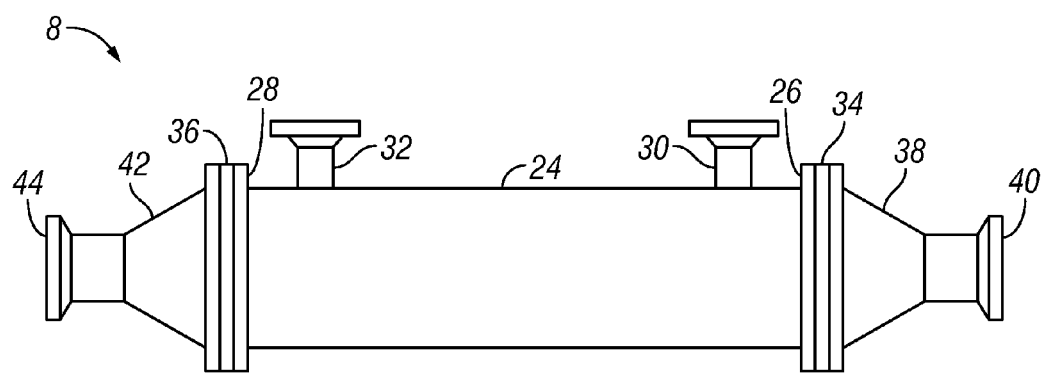
FIG. 2 is a schematic diagram illustrating an example of a recycle gas cooler.

Referring now to FIG. 2, a recycle gas cooler 8 is illustrated in accordance with example embodiments. As illustrated, the recycle gas cooler 8 may be a shell-and-tube heat exchanger that includes a shell 24 having a first end 26 and a second end 28. The shell 24 further may comprise cooling fluid inlet 30 and cooling fluid outlet 32. In the shell 24 are a number of tubes (not shown) mounted between a first tube sheet 34 and a second tube sheet 36. The first tube sheet 34 may be welded onto, or otherwise coupled to, the first end 26 such that the shell 24 and the first tube sheet 34 are one unitary piece. Likewise, the second tube sheet 36 may be welded onto, or otherwise coupled to, the second end 28 of the shell 24, such that the shell 24 and the second tube sheet 36 are one unitary piece. The tubes may be arranged in parallel rows that extend longitudinally through the shell 24. An inlet header 38 may be coupled to the first end 26 with the first tube sheet 34 located between the inlet header 38 and the first end 26 of the shell 24. The inlet header 38 may have a fluid inlet 40 for the recycle stream. The inlet header 38 may include a straight section and a flared section, with the flared section opening toward the heat exchanger shell 24. The flared section may be conical. The straight section's length may be 0-30% of the total length $L_2$ of the header. The inner diameter of the straight section of the outlet header 42 may be the same or similar to the inner diameter of an inlet pipe 46 (the inlet pipe 46 shown in FIG. 3). The recycle stream may enter the inlet header 38 at the fluid inlet 40, flowing through the inlet header 38, and then entering the tubes at the first tube sheet 34. An outlet header 42 may be coupled to the second end 28 with the second tube sheet 36 located between the outlet header 42 and the second tube sheet 28. The outlet header 42 may have a fluid outlet 44 for the recycle stream. The outlet header 42 may include a straight section and a flared section, with the flared section opening toward the heat exchanger shell 24. The flared section may be conical. The straight section's length may be 0-30% of the total length of the header. The inner diameter of the straight section of the outlet header 42 may be the same or similar to the inner diameter of an outlet pipe (shown in FIG. 3, not numbered). The recycle stream may flow through the tubes, entering the outlet header 42 at the second tube sheet 36, and then exiting the outlet header 42 by way of the fluid outlet 44. It should be understood that the preceding description of the recycle gas cooler 8 is merely exemplary and other suitable configurations of shell-and-tube heat exchangers may be used for the recycle gas cooler 8. Certain basic modifications could also be made without affecting the spirit or scope of the disclosed invention. For example, while not illustrated, one could use baffles on the shell side to direct or obstruct flow, as is understood in the art.

Figure 3:
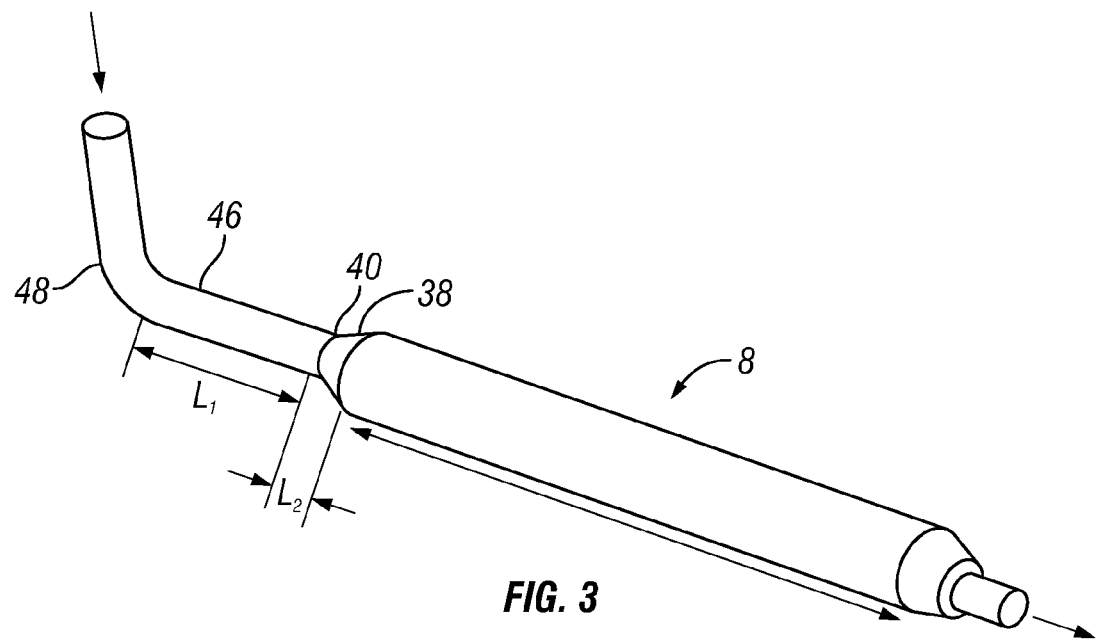
FIG. 3 is a schematic diagram illustrating an example recycle gas cooler system having an elongated straight pipe from the upstream elbow to the inlet of the recycle gas cooler.
Figure 4:
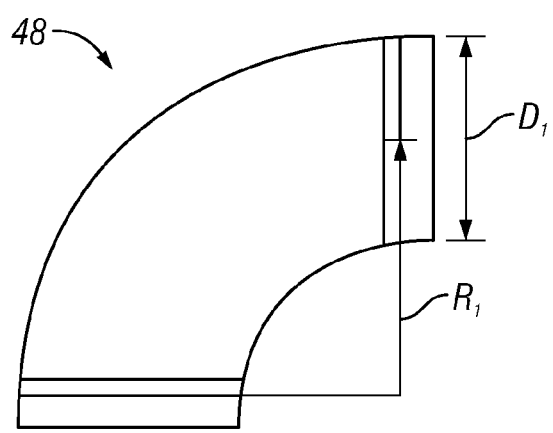
FIG. 4 is a schematic diagram illustrating an example long radius elbow.

Referring now to FIG. 3, a recycle gas cooler system is shown having an inlet pipe 46 coupled to the recycle gas cooler 8 in accordance with example embodiments. As illustrated, the inlet pipe 46 is coupled to the fluid inlet 40 on the inlet header 38. The inlet pipe 46 may comprise one or more sections of pipe. An upstream elbow 48 is shown coupled to the inlet pipe 46 (referred to as "upstream" because it is upstream of the recycle gas cooler 8). Accordingly, the recycle stream flowing into the recycle gas cooler 8 may flow through the upstream elbow 48, then through the inlet pipe 46, and into inlet header 38. The upstream elbow 48 may be a 90° elbow, meaning the upstream elbow 48 has a bend angle of 90°. Examples of suitable upstream elbows include standard radius 90° elbows. Suitable upstream elbows also include short radius 90° elbows and/or long radius 90° elbows. These terms are defined by reference to FIG. 4. As shown in FIG. 4, the upstream elbow 48 has a centerline radius $R_1$ and a pipe inner diameter $D_1$. An upstream elbow 48 having an $R_1/D_1$ value of about 1 may be referred to as a standard radius 90° elbow. An upstream elbow 48 having an $R_1/D_1$ value of about 1.5 or greater may be referred to as a long radius 90° elbow. An upstream elbow 48 having an $R_1/D_1$ value of less than about 1 may be referred to as a short radius 90° elbow. In an embodiment, the upstream elbow 48 may have an $R_1/D_1$ value of about 1.5, or about 1.5 or greater. In another embodiment, the upstream elbow 48 may have an $R_1/D_1$ value of about 3, or about 3 or greater. In some embodiments, the upstream elbow 48 may have an $R_1/D_1$ of about 1 or greater.

Referring again to FIG. 3, embodiments may include adapting the inlet pipe 46 to have a longer length of straight pipe between the upstream elbow 48 and the fluid inlet 40 of the recycle gas cooler 8 than has been used previously. By lengthening this straight portion of the inlet pipe 46, it has been found that the flow of the recycle stream at the fluid inlet 40 may be more uniform in direction and velocity. Without wishing to be bound by theory, it is believed that this more uniform flow at the fluid inlet 40 reduces fouling in the recycle gas cooler 8 by, for example, decreasing or potentially even eliminating flow vortexes and slow flow regions in the inlet header 38 and front end of the recycle gas cooler 8 that can increase catalyst residence time. The inlet pipe 46 may have a length $L_1$ of straight pipe between the upstream elbow 48 and the fluid inlet 40 that is at least about 5 times the inner diameter of the inlet pipe 46. Additionally or alternatively, the inlet pipe 46 may have a length $L_1$ of straight pipe between the upstream elbow 48 and the fluid inlet 40 that is at least about 5 times the inner diameter of the inlet pipe 46 or a length $L_1$ of straight pipe that is at least about 15 feet, whichever is greater. Additionally, the inlet pipe 46 may have a length $L_1$ of straight pipe between the upstream elbow 48 and the fluid inlet 40 that is at least about 6 times, at least about 7 times, or at least about 8 times the inner diameter of the inlet pipe 46. By way of further example, the inlet pipe 46 may have a length $L_1$ of straight pipe between the upstream elbow 48 and the fluid inlet 40 that is at least about 20 feet, at least about 25 feet, or at least about 30 feet. Additionally, the inlet pipe 46 may have a length $L_1$ of straight pipe between the upstream elbow 48 and the fluid inlet 40 that is a minimum of at least about 15 feet, at least about 20 feet, at least about 25 feet, or at least about 30 feet, and a maximum of at least about 20 feet, at least about 25 feet, at least about 30 feet, at least about 40 feet, at least about 50 feet, or greater.

Additional embodiments may include adapting the inlet header 38 to have a longer total length $L_2$. Without wishing to be bound by theory, it is believed that increasing the total length $L_2$ of the inlet header 38 provides more uniform flow in the inlet header 38 by reducing flow vortexes or other slow flow regions that can increase residence time of catalyst. For example, the inlet header 38 may have a total length $L_2$ that is at least about 4 feet, at least about 5 feet, at least about 6 feet, between about 4 and 6 feet, or between about 5 feet and 6 feet. In one particular embodiment, the inlet header 38 may have a total length $L_2$ that is at least about 5.5 feet. While not illustrated in FIG. 3, the internal cavity of the inlet header 38 may gradually expand in diameter, for example, from the fluid inlet 40, with or without a small straight section, to the first tube sheet 34. Extension of the total length $L_2$ of the inlet header 38 should, in turn, make the expansion in diameter of the fluid inlet 40 more gradual.

Figure 5:
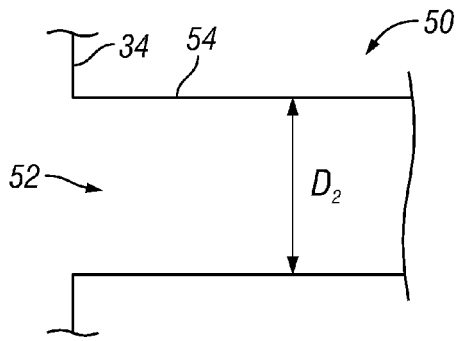
FIG. 5 is a schematic diagram illustrating a tube of a recycle gas cooler having a straight tube inlet in accordance with the prior art.

FIG. 5 illustrates a tube 50 in accordance with the prior art and having a tube inlet 52 at first tube sheet 34. While only one tube 50 is shown, it is understood that a typical shell and tube heat exchanger would comprise a plurality of tubes like tube 50 extending between the first tube sheet 34 and the second tube sheet (not shown). A typical tube 50 may have an inner diameter $D_2$ of 0.5 to 2 inches. In operation, a portion of the recycle stream flows into the tube inlet 52. In prior art embodiments, the tube inlet 52 is generally straight in the portion that is downstream from the tube sheet 34, meaning this portion of the tube inlet 52 does not contain any bends or other curves. However, it has been found that this prior art design causes vortexes, regions of slow flow, and even recirculation zones, for example, near the tube wall 54, which can increase catalyst residence time in the recycle gas cooler 8 and lead to cooler fouling.

It has been found that certain adaptations may be made to the prior art design in FIG. 5 to create more uniform flow with respect to direction and velocity. Without wishing to be bound by theory, it is believed that more uniform flow at the tube inlet 52 reduces fouling in the recycle gas cooler 8, for example, by reducing or potentially even eliminating recycle vortexes and other slow flow regions such that residence time of the catalyst in the tube 50 may be decreased. In this manner, undesired polymer production in the recycle gas cooler 8 can be minimized or eliminated.

Figure 6:
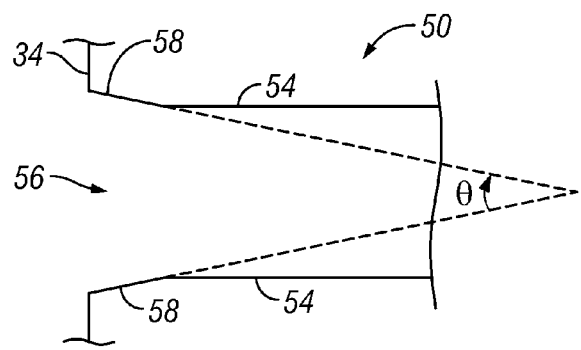
FIG. 6 is a schematic diagram illustrating an example tube of a recycle gas cooler having a conical-shaped tube inlet.

For example, the tube 50 in FIG. 5 may be adapted to have a flared tube inlet. FIG. 6 illustrates one embodiment of a tube 50 having a flared tube inlet in the form of a conical-shaped tube inlet 56. The tube 50 includes tube wall 54 that has angled portion 58. The angled portion 58 of the tube wall 54 forms the conical shaped tube inlet 56. In the illustrated embodiment, the conical-shaped tube inlet 56 opens outward to the first tube sheet 34. As illustrated, the conical-shaped tube inlet 56 may have a conical angle $\theta$. In general, the conical angle $\theta$ refers to the angle formed at the intersection formed by extending the angled portions in a straight line until they intersect. In some embodiments, the conical angle $\theta$ may be in a range of from about 10° to about 45°, from about 20° to about 40°, or from about 25° to about 35°. In one particular embodiment, the conical-shaped tube inlet may have a conical angle $\theta$ of about 30°. In another embodiment, the conical-shaped tube inlet may have a conical angle $\theta$ of about 20°.

Figure 7:
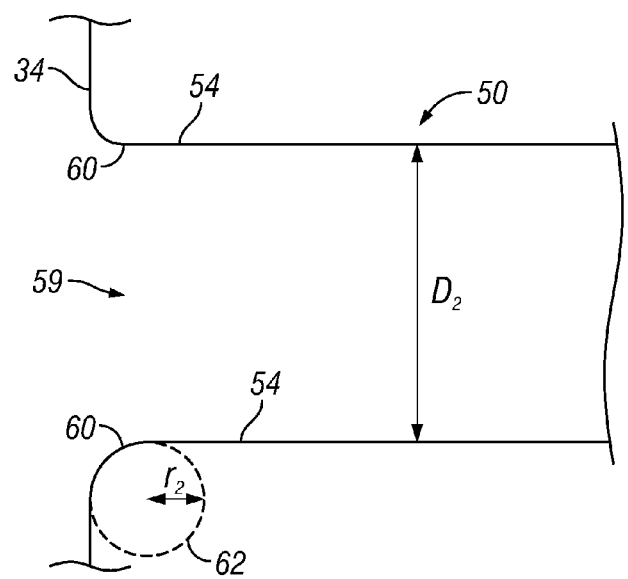
FIG. 7 is a schematic diagram illustrating an example tube of a recycle gas cooler having a flared tube inlet.

FIG. 7 illustrates another embodiment of a tube 50 having a flared tube inlet 59 in which the tube wall 54 opens outward at the first tube sheet 34. As illustrated, the tube wall 54 includes a rounded portion 60 at the first tube sheet 34. Those of ordinary skill in the art will appreciate that the curve of rounded portion 60 may be defined by its radius of curvature, which is the radius $r_2$ of approximate circle 62 that best approximates the curve of rounded portion 60. In some embodiments, the curve may have a ratio of $r_2$ to tube inner diameter $D_2$ that is in a range of from about 0.1 to about 0.25. For example, the curve may have a ratio of $r_2$ to tube inner diameter $D_2$ that is about 0.1, about 0.15, about 0.2, or about 0.25.

In some embodiments, the recycle gas cooler 8 may be designed to have a minimum gas momentum flux through the tubes of at least about 3000 lb/ft/sec$^2$ at inlet conditions, including for condensing mode of operation. In alternative embodiments, the recycle gas cooler 8 may have a minimum gas momentum flux through the tubes of at least about 3,500 lb/ft/sec² or at least about 4,000 lb/ft/sec² at inlet conditions. Those of ordinary skill in the art, with the benefit of this disclosure, appreciate that gas momentum flux through the tubes of the recycle gas cooler is dependent upon a number of factors, including flow rate, tube count, tube inner diameter, and gas properties, but could readily be determined and set in a particular process once these factors are determined for the process.

As previously mentioned, the recycle gas cooler 8 disclosed herein may be used with gas-phase polymerization of one or more olefins, such as ethylene or propylene. The polymerization process may be conducted over a wide range of temperatures and pressures. The temperatures, for example, may be in the range of from about 50° C. to about 150° C. In some embodiments, the reactor temperature in may vary, for example, from about 30° C. to about 120° C., or from about 60° C. to about 115° C., or from about 70° C. to about 110° C., or from about 70° C. to about 95° C.

The gas-phase polymerization process may use one or more olefin monomers having from 2 to 30 carbon atoms, or from 2 to 12 carbon atoms, or from 2 to 8 carbon atoms. For example, two or more olefins or comonomers such as ethylene, propylene, 1-butene, 1-pentene, 4-methyl-1-pentene, 1-hexene, 1-octene, or 1-decene, may be used. For example, a copolymer of ethylene may be produced, with ethylene and a comonomer having at least one alpha-olefin having from 4 to 15 carbon atoms, or from 4 to 12 carbon atoms, or from 4 to 8 carbon atoms.

In some embodiments, ethylene or propylene may be polymerized with at least two different comonomers, optionally one of which may be a diene, to form a terpolymer.

In some embodiments, the gas-phase polymerization reaction can be carried out in a single reactor or multiple reactors, such as two or more reactors in series or in parallel.

Typically in a gas-phase polymerization process a continuous cycle is employed where in one part of the cycle of a reactor system, a cycling gas stream, otherwise known as a recycle stream or fluidizing medium is heated in the reactor by the heat of polymerization. This heat is removed from the recycle composition in another part of the cycle by a cooling system external to the reactor. Generally, in a gas-phase, fluidized-bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Examples of gas-phase polymerization processes are described in U.S. Pat. Nos. 4,543,399, 4,588,790, 5,028,670, 5,317,036, 5,352,749, 5,405,922, 5,436,304, 5,453,471, 5,462,999, 5,616,661, 5,627,242, 5,665,818, 5,668,228, and 5,677,375, and in European publications EP-A-0 794 200, EP-A-0 802 202, EP-A2 0 891 990 and EP-B-634 421.

The reactor pressure in a gas-phase process may vary, for example, from about atmospheric pressure to about 600 psig. In some embodiments, the reactor pressure may vary from about 100 psig (690 kPa) to about 500 psig (3448 kPa), or from about 200 psig (1379 kPa) to about 400 psig (2759 kPa), or from about 250 psig (1724 kPa) to about 350 psig (2414 kPa).

In some embodiments, a "condensing mode," including the "induced condensing mode" and "liquid monomer" operation of a gas-phase polymerization may be used. Embodiments of the polymerization processes disclosed herein may be operated in a condensing mode, similar to those disclosed in U.S. Pat. Nos. 4,543,399, 4,588,790, 4,994,534, 5,352,749, 5,462,999, and 6,489,408, and U.S. Patent Appl. Pub. No. 2005/0137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

The condensing mode of operation in polymerization reactors may significantly increase the production rate or space time yield by providing extra heat-removal capacity through the evaporation of condensates in the cycle gas. Additional condensation is often promoted to extend the utility of condensed mode operation by adding an induced condensing agent ("ICA") into the reactor.

The amount of condensation of liquid in the circulating components can be maintained at up to about 90 percent by weight, for example. In some embodiments, the amount of condensation is in the following ranges: from about 1 percent by weight to 60 percent by weight; or from about 2 percent by weight to about 40 percent by weight; or from about 4 percent by weight to about 30 percent by weight. This degree of condensation is achieved by controlling the outlet temperature from the heat exchanger so as to achieve the required degree of cooling below the dew point of the mixture.

Suitable ICAs include but are not limited to hexane, isopentane, cyclobutane, neopentane, n-butane, isobutane, cyclopropane, propane, and mixtures thereof. As will be appreciated by those of ordinary skill in the art, some alkanes are more effective ICAs than others to the extent that they provide, for example, a greater degree of cooling upon their evaporation. In the gas state, for example, a mole of propane, butane, pentane, or hexane all take up the same volume and occupy the same volume in the reactor. Some, such as the higher chain alkanes, provide a greater degree of cooling, heat adsorption, and production rate capacity in condensing mode operation without the need for high concentrations in the recirculating gas. In addition, their dew point temperature is also higher, making it easier to condense in the recycle cooling system.

In addition to the previously described polymerization techniques, "enhanced dry mode operation" of a gas-phase polymerization may also be used. The enhanced dry mode of operation in polymerization reactors may increase the production rate or space time by providing extra heat-removal capacity through the addition of an alkane having from 3 to 7 carbon atoms to the cycle gas. In some embodiments, suitable alkanes include cyclobutane, neopentane, n-butane, isobutane, cyclopropane, propane, and mixtures thereof. While these alkanes may be similar to those employed in an induced condensing mode, their concentration is kept below that required alone, or in combination, for condensing the gas in the recycle cooling system.

Any type of polymerization catalyst may be used, including liquid-form catalysts, solid catalysts, and supported solid catalyst, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts (including one or more supported catalysts), or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium-based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium-based catalysts, such as those described in U.S. Pat. Nos. 3,709,853; 3,709,954; and 4,077,904.

C. Vanadium-based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Any combination of one or more of the catalysts of the above.

In one or more embodiments, a "mixed" catalyst system or "multi-catalyst" system may be used. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having the same or different metal group but having at least one different catalyst component, for example, a different ligand or general catalyst structure. Examples of useful bimetallic catalysts can be found in U.S. Pat. Nos. 6,271,325, 6,300,438, and 6,417,304. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

Catalyst systems herein may include an activator. The term "activator" is defined to be any compound or component which can activate a bulky ligand transition metal metallocene-type catalyst compound as described above. For example, a Lewis acid or a non-coordinating ionic activator or ionizing activator or any other compound that can convert a neutral metallocene catalyst component to a metallocene cation. Useful activators may include alumoxane or modified alumoxane, or ionizing activators, neutral or ionic, such as tri(n-butyl)ammonium tetrakis(pentafluorophenyl)boron or a trisperfluorophenyl boron metalloid precursor which ionize the neutral metallocene compound may also be used. A preferred activator used with the catalyst compositions described herein is methylaluminoxane ("MAO"). The MAO activator may be associated with or bound to a support, either in association with the catalyst component (e.g., metallocene) or separate from the catalyst component, such as described by Gregory G. Hlatky, *Heterogeneous Single-Site Catalysts for Olefin Polymerization*, 100(4) CHEMICAL REVIEWS 1347-1374 (2000).

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838 and European publications EP-A-0 561 476, EP-B1-0 279 586 and EP-A-0 594-218, and PCT publication WO 94/10180.

Ionizing compounds may contain an active proton, or some other cation associated with but not coordinated or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198, 401, 5,066,741, 5,206,197, 5,241,025, 5,387,568, 5,384,299, and 5,502,124.

Combinations of activators are also contemplated, for example, alumoxanes and ionizing activators in combination, see for example, PCT publications WO 94/07928 and WO 95/14044 and U.S. Pat. Nos. 5,153,157 and 5,453,410.

The described catalyst compounds, activators and/or catalyst systems, as noted above, may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2/g$. Silica has a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are described in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize electrostatic in the fluidized-bed reactor, others known as drivers rather than antistatic agents, may consistently force the static from positive to negative or from negative to positive. The use of these additives is well within the skill of those skilled in the art. These additives may be added to different locations in the reactor recycle system, or independently from the catalyst injection, or as part of the catalyst injection.

In embodiments, the reactors disclosed herein are capable of producing greater than 500 lbs of polymer per hour (227 kg/hr) to about 300,000 lbs/hr (136,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 150,000 lbs/hr (68,100 kg/hr).

The polymers produced by embodiments of the processes of the invention can be used in a wide variety of products and end-use applications. The polymers produced by the processes of the invention may include, but are not limited to, linear low density polyethylene, low density polyethylenes, and high density polyethylenes.

The polymers, including ethylene and propylene based polymers, have a density measured according to ASTM D-792, for example, in the range of from about 0.86 g/cm$^3$ to about 0.97 g/cm$^3$. In other embodiments, the polymers have a density in the range of from about 0.88 g/cm$^3$ to about 0.965 g/cm$^3$ or in the range of from about 0.900 g/cm$^3$ to about 0.96 g/cm$^3$.

The polymers produced by the process of the invention may have a molecular weight distribution, a weight average molecular weight to number average molecular weight (Mw/Mn), for example, of greater than 1.5 to about 15. In other embodiments, the polymers may have an Mw/Mn of greater than 2 to about 10 or greater than about 2.2 to less than about 8.

The polymers of the present invention may have a melt index (MI) or (I2) as measured by ASTM-D-1238-E (190° C./2.16 kg), for example, in the range from 0.01 dg/min to 1000 dg/min. In other embodiments, the polymers may have a melt index of from about 0.01 dg/min to about 100 dg/min or from about 0.1 dg/min to about 100 dg/min.

The polymers of the invention in an embodiment may have a melt index ratio (I21/I2) (I21 is measured by ASTM-D-1238-F, [190° C./21.6 kg]), for example, of from 5 to 300. In other embodiments, the polymers may have a melt index ratio of from about 10 to less than 250, from 15 to 200, or from 20 to 180.

The polymers of the invention may be blended and/or coextruded with any other polymer. Non-limiting examples of other polymers include linear low density polyethylenes produced via conventional and/or single-site catalysis, elastomers, plastomers, high pressure low density polyethylene, high density polyethylenes, polypropylenes and the like.

Polymers produced by the process of the invention and blends thereof are useful in such forming operations as film, pipe, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners. Molded articles include single and multi-layered constructions in the form of bottles, tanks, large hollow articles, rigid food containers and toys, etc.

EXAMPLES

The following examples are provided to further illustrate particular embodiments of the invention, and are not intended to limit the scope of the invention.

Example 1

Three simulations were conducted using a commercial finite volume computational fluid dynamics code, starting with a base case that in general uses the design shown in FIG. 3, and then analyzing the impact of varying the following parameters as described. Simulation 1 had an upstream elbow that was a standard radius 90° elbow ($R_1/D_1$ value of 1) connected to inlet pipe 46, and inlet pipe 46 had an $L_1$ of 15 feet. Simulation 2 was the same as Simulation 1, except $L_1$ was lengthened to 30 feet. Simulation 3 was the same as Simulation 1, except the upstream elbow was a long radius 90° elbow ($R_1/D_1$ value of 3). The simulation model measured flow distribution of the recycle stream in the axial direction at the fluid inlet 40. For this simulation, the following conditions were used:

TABLE 1

| Parameter | Simulation Conditions |
| --- | --- |
| Superficial Gas Velocity | 2.4 ft/sec in a 17 feet inner diameter polymerization reactor |
| Cycle Pipe Diameter | 40 inches inner diameter |
| Shell Diameter | 78 inches inner diameter |
| Temperature | 111° C. |
| Pressure | 350 psig |
| Inlet Velocity (at inlet header) | 62.43 ft/sec |
| Gas Composition (mol %) | |
| $C_2H_4$ | 65.81 |
| $H_2$ | 16.45 |
| $C_2H_6$ | 1.71 |
| Iso-Pentane | 6.19 |
| $CH_4$ | 1.16 |
| $N_2$ | 8.68 |
| Gas Density | 1.35 lb/ft$^3$ (21.67 kg/m$^3$) |
| Gas Viscosity | $1.4 \times 10^{-5}$ Pa-sec |

The simulations were conducted to determine the Coefficient of Variation (COV) for the recycle stream at the flow inlet 40 for the inlet header 38. The COV is a measure of the uniformity of flow in the cross-sectional area of the flow inlet 40 and can also be referred to as the Normalized Standard Deviation of Gas Velocity in the axial direction. A smaller value for the COV means a more uniform distribution of flow in the cross-sectional area. A perfectly uniform distribution of velocity across the cross-sectional area would yield a COV of 0. The COV at the flow inlet 40 for the inlet header 38 is considered a key indicator of how flow distribution affects the recycle gas cooler 8. A smaller COV at the flow inlet 40 means a more uniform flow of the recycle stream going into the recycle gas cooler 8 with a less chance of cooler fouling.

The results of the three simulations are provided in Table 2 below.

TABLE 2

| Simulation | Inlet Pipe Straight Length | Elbow Type | Elbow $R_1/D_1$ value | COV |
|---|---|---|---|---|
| 1 | 15 feet | Standard Radius 90° Elbow | 1 | 25.8% |
| 2 | 30 feet | Standard Radius 90° Elbow | 1 | 11.3% |
| 3 | 15 feet | Long Radius 90° Elbow | 3 | 10.4% |

As set forth in the table above, Simulation 2 having a longer length of straight pipe beween the upstream elbow 48 and the inlet header 38 had more uniform flow at the flow inlet 40 as indicated by a COV of 11.3% compared to the base case COV from Simulation 1 of 25.8%. In addition, use of the long radius 90° elbow also resulted in more uniform flow at the flow inlet 40 as indicated by a COV of 10.4% compared to the base case COV from Simulation 1 of 25.8%.

Example 2

Four additional simulations were conducted using a commercial finite volume computational fluid dynamics code to analyze the impact of varying the geometery of the inlet of the cooler tubes, such as tube 50. Comparative Simulation 4 used a straight tube inlet according to the prior art, as shown in FIG. 5. Simulation 5 used a flared tube inlet having an $r_2/D_2$ value of 0.15, as shown on FIG. 7. Simulation 6 used a flared tube inlet that was conical-shaped having a conical angle θ of 20°, as shown on FIG. 6. Simulation 7 used a flared tube inlet that was conical-shaped having a conical angle θ of 30°, as shown on FIG. 6. The simulation modeled one whole tube and each of its nearest neighbors using symmetry boundaries. Discretization used was third order (quick scheme) for momentum equations and second order for turbulence parameters. For this simulation, the following conditions were used:

TABLE 3

| Parameter | Simulation Conditions |
|---|---|
| Superficial Gas Velocity | 2.4 ft/sec in a 17 feet inner diameter polymerization reactor |
| Cycle Pipe Diameter | 40 inches inner diameter |
| Shell Diameter | 78 inches inner diameter |
| Temperature | 111° C. |
| Pressure | 350 psig |
| Inlet Velocity (at tube inlet) | 26.4 ft/sec |
| Gas Composition (mol %) | |
| $C_2H_4$ | 65.81 |
| $H_2$ | 16.45 |
| $C_2H_6$ | 1.71 |
| Iso-Pentane | 6.19 |
| $CH_4$ | 1.16 |
| $N_2$ | 8.68 |
| Gas Density | 1.35 lb/ft³ (21.67 kg/m³) |
| Gas Viscosity | $1.4 \times 10^{-5}$ Pa-sec |

From this simulation, it was found that the lowest velocities for Comparative Simulation 4 were in areas near the walls at the tube inlets (<0.8 inches inside tubes). In these areas, vortexes and/or areas of recirculating flow were observed. In these recirculation zones in Comparative Simulation 4, there were flow velocities in the range of 0.2 to 1.2 meters per second, which could lead to particle settling and fouling. For Simulation 5, having the flared tube inlet, no vortexes or recirculation zones were observed. For Simulation 6, having the flared tube inlet that is conical-shaped with a 20° conical angle, there was a small recirculation zone near the tube inlet, but the recirculation zone was smaller than the zones observed for Comparative Simulation 4. For Simulation 7, having a flared tube inlet that is conical-shaped with a 30° conical angle, there was a very small recirculation zone right at the tube inlet, but the recirculation zone was smaller than for Comparative Simulation 4 and Simulation 6.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A recycle gas cooler system in a gas-phase polymerization process for cooling a recycle stream, comprising:
    an upstream elbow having a centerline radius;
    a straight inlet pipe coupled to the upstream elbow and having an inner diameter and a length; and
    a shell-and-tube heat exchanger;
    wherein the length of the straight inlet pipe is either at least about 5 times the inner diameter of the straight inlet pipe or at least about 15 feet, whichever is greater.

2. The system according to claim 1, wherein the upstream elbow has a ratio of the centerline radius to the inner diameter of the straight inlet pipe of about 1.5 or greater.

3. The system according to claim 2, wherein the ratio of the centerline radius to the inner diameter is about 3.

4. The system according to claim 1, wherein the length of the straight inlet pipe is at least about 20 feet.

5. The system according to claim 1, wherein the length of the straight inlet pipe is at least about 30 feet.

6. The system according to claim 1, wherein the length of the straight inlet pipe is at least about 8 times the inner diameter of the straight inlet pipe.

7. The system according to claim 1, wherein the shell-and-tube heat exchanger comprises an inlet header, and the inlet header has a total length of at least about 4 feet.

8. The system according to claim 1, wherein the shell-and-tube heat exchanger comprises one or more tubes and one or more of the tubes has a flared tube inlet.

9. The system according to claim 1, wherein the shell-and-tube heat exchanger comprises one or more tubes and one or more of the tubes has a flared tube inlet in the form of a conical-shaped tube inlet having a conical angle in a range of from about 10° to about 45°.

10. The system according to claim 1, wherein the shell-and-tube heat exchanger comprises one or more tubes and one or more of the tubes has a flared tube inlet having a rounded portion that opens outward toward the tube sheet, wherein the rounded portion has a radius of curvature and the one or more tubes has an inner diameter, and wherein a ratio of the radius of curvature to the inner diameter of the one or more tubes is in a range of from about 0.1 to about 0.25.

11. The system according to claim 1, wherein the shell-and-tube heat exchanger is characterized by a minimum gas momentum flux through the tubes of at least about 3000 lb/ft/sec$^2$ at inlet conditions.

12. A recycle gas cooler in a gas-phase polymerization process for cooling a recycle stream, comprising:
   a shell-and-tube heat exchanger, wherein the shell-and-tube heat exchanger comprises:
      a shell having a first end and a second end, wherein the shell comprises a cooling fluid inlet and a cooling fluid outlet;
      tubes disposed in the shell, wherein the tubes are fixed in a tube sheet at the first end of the shell, wherein one or more tubes has a flared tube inlet at the tube sheet;
      an inlet header coupled to the first end of the shell, wherein the inlet header is coupled to a straight inlet pipe having a length that is either at least about 5 times an inner diameter of the straight inlet pipe or at least about 15 feet, whichever is greater; and
      an outlet header coupled to the second end of the shell, the outlet header comprising a fluid outlet.

13. The recycle gas cooler according to claim 12, wherein the flared tube inlet of the one or more tubes is conical-shaped having a conical angle in a range of from about 10° to about 45°.

14. The recycle gas cooler according to claim 12, wherein the flared tube inlet has a rounded portion that opens outward toward the tube sheet.

15. The recycle gas cooler according to claim 14 wherein the rounded portion has a radius of curvature and the one or more tubes has an inner diameter, and wherein a ratio of the radius of curvature to the inner diameter of the one or more tubes is in a range of from about 0.1 to about 0.25.

16. The recycle gas cooler according to claim 12, wherein the shell-and-tube heat exchanger is characterized by a minimum gas momentum flux through the tubes of at least about 3000 lb/ft/sec$^2$ at inlet conditions.

17. A polymerization process comprising: polymerizing at least one olefin in a gas-phase polymerization reactor in the presence of a catalyst; withdrawing a recycle stream from the gas-phase polymerization reactor; and cooling the recycle stream using the recycle gas cooler of claim 1 or claim 12.

18. The polymerization process according to claim 17, wherein the at least one olefin comprises ethylene.

\* \* \* \* \*